United States Patent
Syed et al.

(10) Patent No.: US 10,443,512 B2
(45) Date of Patent: Oct. 15, 2019

(54) DETECTION OF UNCOMMANDED AND UNCONTROLLABLE HIGH THRUST EVENTS

(71) Applicant: PRATT & WHITNEY CANADA CORP., Longueuil (CA)

(72) Inventors: Yusuf Syed, Oakville (CA); Michael Krynski, Waterdown (CA); Antwan Shenouda, Mississauga (CA); Frederic Giroux, St-Jean-sur-Richelieu (CA); Ioan Sabau, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 137 days.

(21) Appl. No.: 15/476,271

(22) Filed: Mar. 31, 2017

(65) Prior Publication Data

US 2018/0283286 A1    Oct. 4, 2018

(51) Int. Cl.
*F02C 9/46* (2006.01)
*F02C 9/28* (2006.01)

(52) U.S. Cl.
CPC ............... *F02C 9/46* (2013.01); *F02C 9/28* (2013.01); *F05D 2270/021* (2013.01); *F05D 2270/051* (2013.01)

(58) Field of Classification Search
CPC .... F02C 9/26; F02C 9/263; F02C 9/28; F02C 9/285; F02C 9/44; F02C 9/46; F05D 2270/021; F05D 2270/051
See application file for complete search history.

(56) References Cited

U.S. PATENT DOCUMENTS

| | | | |
|---|---|---|---|
| 3,936,226 A | | 2/1976 | Harner et al. |
| 4,258,545 A | * | 3/1981 | Slater ............. F02C 9/00 60/226.1 |
| 4,958,289 A | | 9/1990 | Sum et al. |
| 6,578,794 B1 | | 6/2003 | Clark et al. |
| 6,655,126 B2 | * | 12/2003 | Walker ............. F02C 9/28 60/243 |
| 6,704,630 B2 | | 3/2004 | Ostrom et al. |
| 7,184,865 B2 | | 2/2007 | Mangelsdorf |
| 8,414,260 B2 | | 4/2013 | Johnson |
| 8,651,811 B2 | | 2/2014 | Danielson |
| 8,954,228 B2 | | 2/2015 | Falkmann et al. |
| 9,470,152 B2 | | 10/2016 | MacDonald et al. |

(Continued)

FOREIGN PATENT DOCUMENTS

FR    2996254    4/2014

OTHER PUBLICATIONS

Search Report dated Jan. 14, 2019 in connection with European Patent application No. 18190084.6.

*Primary Examiner* — Steven M Sutherland
*Assistant Examiner* — James P McGlynn
(74) *Attorney, Agent, or Firm* — Norton Rose Fulbright Canada LLP

(57) ABSTRACT

Herein provided are methods and systems for detecting an uncommanded or uncontrollable high thrust (UHT) event in an aircraft, comprising arming a UHT function, detecting a fuel flow error when an actual fuel flow minus a commanded fuel flow exceeds a first threshold, the fuel flow error indicative of a presence of excess thrust, detecting a UHT event based on excess thrust and as a function of a second threshold, upon detection of the fuel flow error, and accommodating the UHT event.

18 Claims, 9 Drawing Sheets

(56) References Cited

U.S. PATENT DOCUMENTS

| | | | |
|---|---|---|---|
| 9,932,906 B2 | 4/2018 | Xiong et al. | |
| 2015/0027412 A1* | 1/2015 | Henson | F02C 7/236 123/457 |
| 2015/0219528 A1* | 8/2015 | Djelassi | F02C 9/28 702/44 |
| 2016/0010590 A1* | 1/2016 | Rolt | F01D 17/143 60/805 |
| 2016/0121998 A1 | 5/2016 | Martin Moreno et al. | |
| 2016/0208717 A1* | 7/2016 | Cai | F02C 3/10 |
| 2016/0265445 A1* | 9/2016 | Fiedler | F01D 21/02 |
| 2016/0357170 A1* | 12/2016 | Beecroft | G05B 19/128 |
| 2017/0107914 A1 | 4/2017 | Lu et al. | |
| 2018/0057184 A1 | 3/2018 | Jackowski et al. | |

\* cited by examiner

DETECTION OF UNCOMMANDED AND UNCONTROLLABLE HIGH THRUST EVENTS

TECHNICAL FIELD

The present disclosure relates generally to the detection of failures to a thrust control system of an aircraft's engine resulting in an uncommanded and/or uncontrollable high thrust event.

BACKGROUND OF THE ART

A failure to the thrust control system of an aircraft's gas turbine engine can result in an uncommanded or uncontrollable high thrust (UHT) event. During certain critical flight phases, this can lead to hazardous situations. For example, during landing or takeoff, a UHT event may cause the aircraft to depart laterally or off the end of the runway.

Pilots have high workloads and reacting to a UHT event requires split second decision making during the critical flight phases. Therefore, there is a need to provide automatic detection and accommodation of UHT in conjunction with a declared intention of the pilot to command low thrust.

SUMMARY

In one aspect, there is provided a method for detecting an uncommanded or uncontrollable high thrust (UHT) event in an aircraft. The method comprises arming a UHT function, detecting a fuel flow error when an actual fuel flow minus a commanded fuel flow exceeds a first threshold, the fuel flow error indicative of a presence of excess thrust, detecting a UHT event based on excess thrust and as a function of a second threshold, upon detection of the fuel flow error, and accommodating the UHT event.

In another aspect, there is provided a system for detecting an uncommanded or uncontrollable high thrust (UHT) event in an aircraft. The system comprises at least one processing unit and a non-transitory computer-readable memory having stored thereon program instructions. The program instructions are executable by the processing unit(s) for arming a UHT function, detecting a fuel flow error when an actual fuel flow minus a commanded fuel flow exceeds a first threshold, the fuel flow error indicative of a presence of excess thrust, detecting a UHT event based on excess thrust and as a function of a second threshold, upon detection of the fuel flow error, and accommodating the UHT event.

In a further aspect, there is provided a non-transitory computer readable medium having stored thereon program code executable by a processor for detecting an uncommanded or uncontrollable high thrust (UHT) event in an aircraft. The program code comprises instructions configured for arming a UHT function, detecting a fuel flow error when an actual fuel flow minus a commanded fuel flow exceeds a first threshold, the fuel flow error indicative of a presence of excess thrust, detecting a UHT event based on excess thrust and as a function of a second threshold, upon detection of the fuel flow error, and accommodating the UHT event.

DESCRIPTION OF THE DRAWINGS

Reference is now made to the accompanying figures in which.

It will be noted that throughout the appended drawings, like features are identified by like reference numerals.

DETAILED DESCRIPTION

There is described herein detection methods and systems for uncommanded or uncontrollable high thrust (UHT) events. A UHT event is defined as a failure to respond to a low thrust command on the part of the engine, thus resulting in excess thrust relative to the command. Many types of failures may result in a UHT event, such as but not limited to an erroneous thrust lever angle (TLA) signal, an erroneous sensor signal used to compute a fuel request, a failure in an electronic circuit driving a fuel metering unit (FMU), a failure in the FMU, and an erroneous central processing unit/uncovered processor failure.

Detection occurs in two steps. In a first step, an abnormal engine response is differentiated from other engine responses as a function of a fuel flow error. In other words, the first step comprises determining that the engine response has deviated sufficiently from an expected or anticipated engine response using actual vs. commanded fuel flow as a measuring tool. This deviation acts as a trigger for a second step. In the second step, a determination is made as to whether excess thrust resulting from the deviation is large enough to require accommodation.

Figure 1:
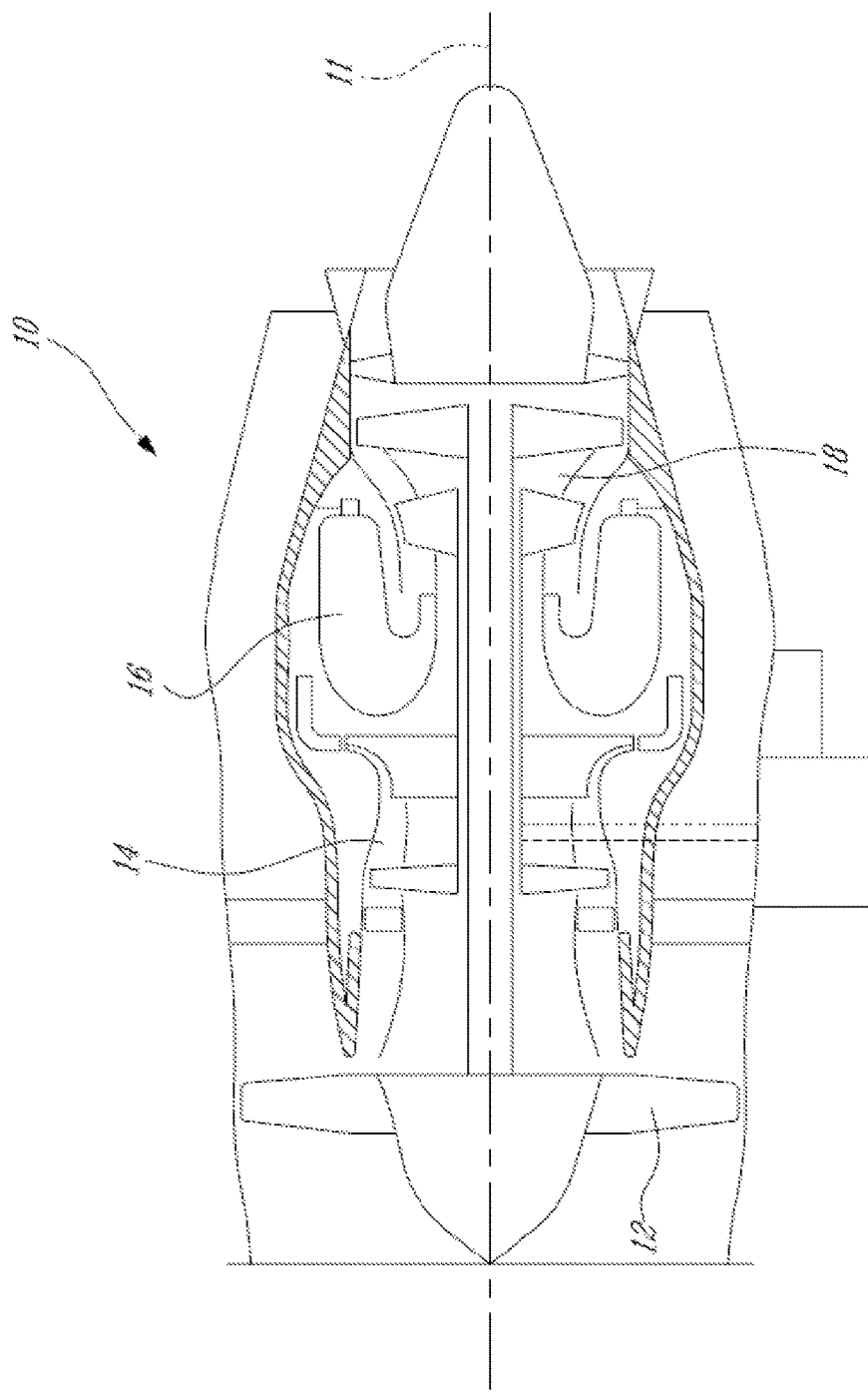
FIG. 1 is a schematic cross-sectional view of an example engine of an aircraft.

FIG. 1 illustrates a gas turbine engine 10 to which the detection methods and systems may be applied. Note that while engine 10 is a turbofan engine, the detection methods and systems may be applicable to turboprop, turboshaft, and other types of aircraft engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

The detection method comprises a step of detecting a fuel flow error, which is compared to a predetermined fuel flow error threshold. The fuel flow can be determined by a fuel flow meter or by any other independent fuel flow measuring device. When the fuel flow error exceeds the fuel flow error threshold, it indicates that the fuel metering valve is not tracking the commanded fuel flow request correctly and that the engine is being overfueled. This may result from a stuck or sluggish fuel metering valve, due to mechanical or electrical failure, or due to fuel contamination.

The fuel flow error is defined as:

$$\text{Fuel Flow Error} = \text{Actual Fuel Flow} - \text{Commanded Fuel Flow}$$

Figure 2A:
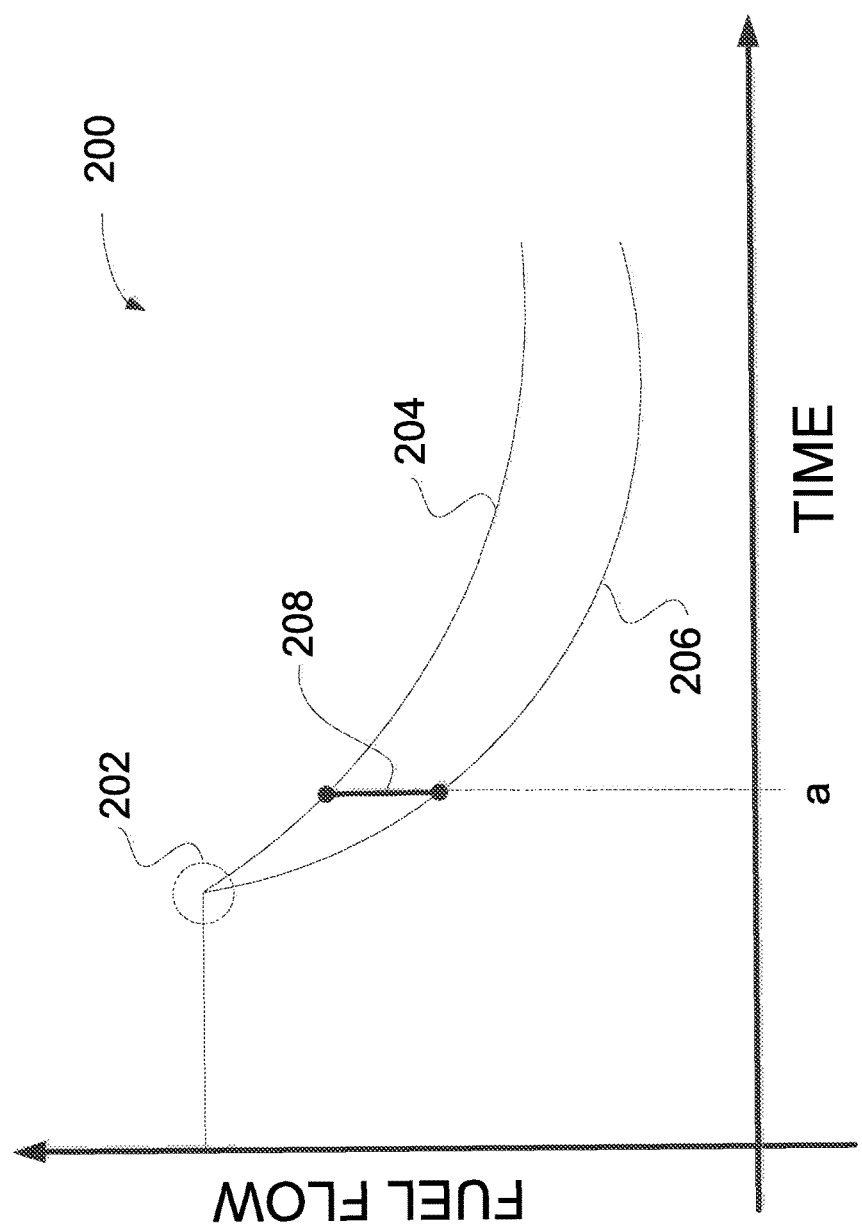
FIG. 2A is a first graph illustrating fuel flow vs time to determine a fuel flow error.
Figure 2B:
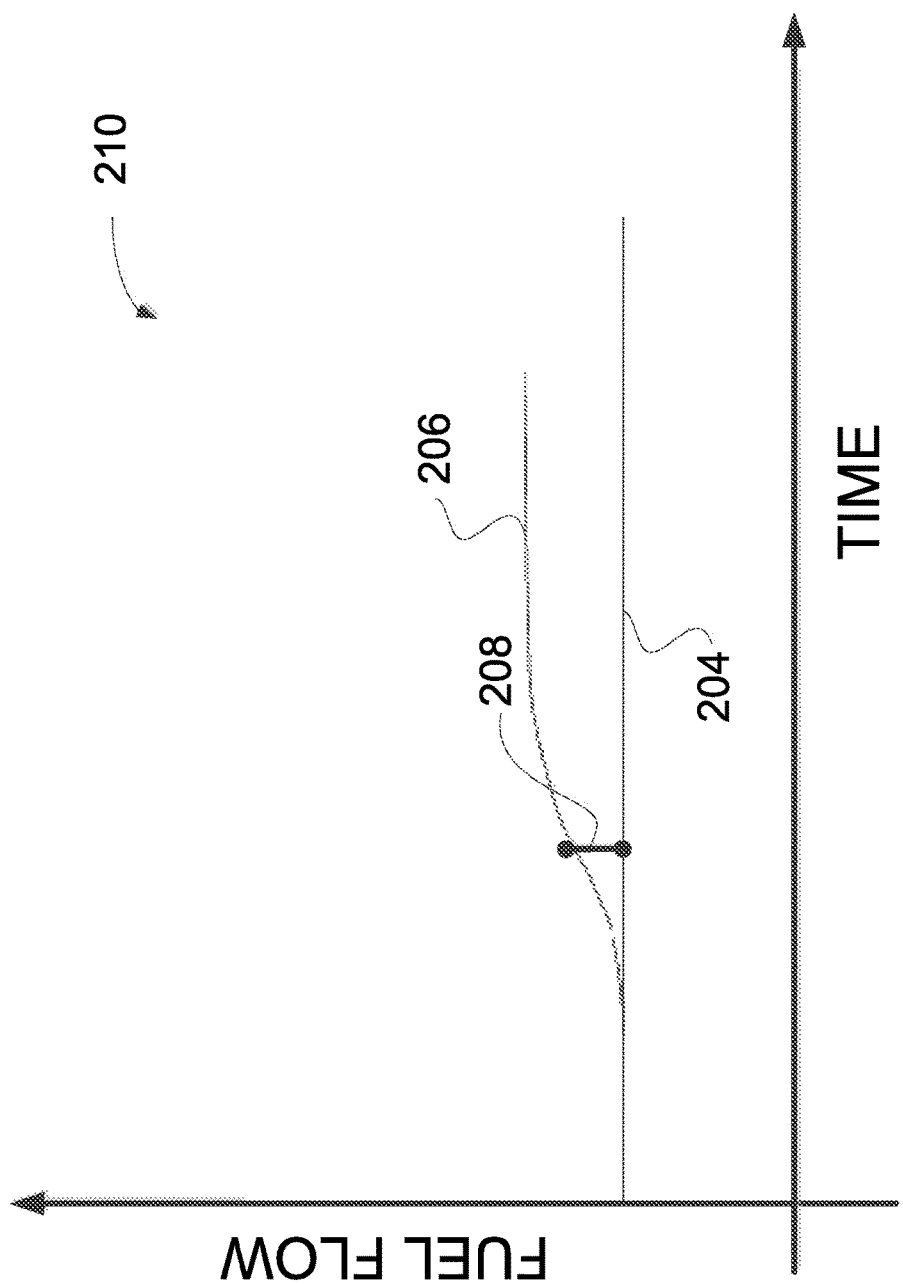
FIG. 2B is a second graph illustrating fuel flow vs time to determine a fuel flow error.

FIG. 2A illustrates an example for determining the fuel flow error. Graph 200 presents fuel flow vs time for both the actual fuel flow 204 and the commanded fuel flow 206. In the first part of both curves, there is no discrepancy between actual fuel flow 204 and commanded fuel flow 206. At the point of inflection 202, the actual fuel flow 204 begins to deviate from the commanded fuel flow 206. Over time, the difference between actual fuel flow 204 and commanded fuel flow 206 increases. The value separating actual fuel flow 204 and commanded fuel flow 206 is the fuel flow error 208. When the fuel flow error exceeds the fuel flow error threshold, for example a time t=a, this triggers further analysis to determine if the excess thrust resulting from the fuel flow error is critical and thus requires accommodation. Note that the fuel flow error threshold is based on known fuel system responses and may thus vary from one fuel system to another. FIG. 2B illustrates another example for determining the fuel flow error. Graph 210 presents a scenario of a runaway engine when the Throttle Lever Angle (TLA) is at idle or low power.

Figure 3A:
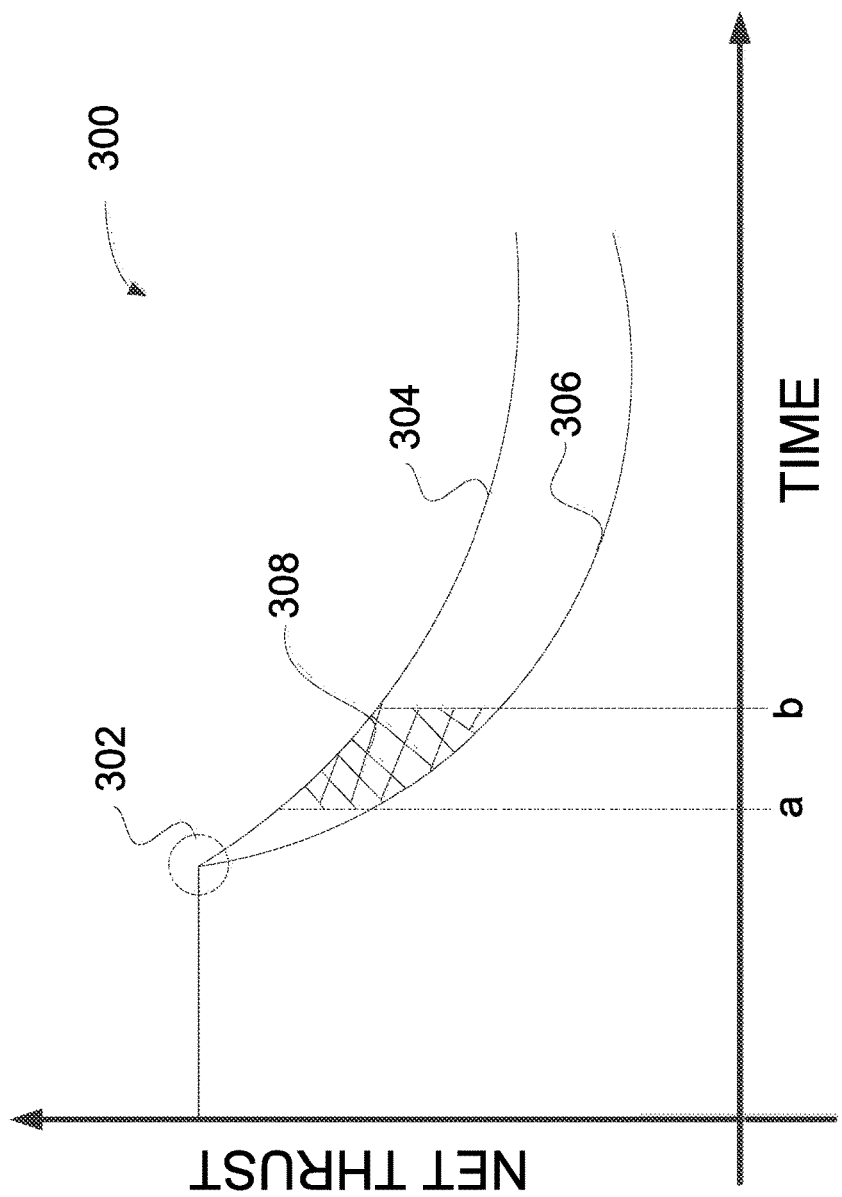
FIG. 3A is a first graph illustrating net thrust over time to determine an estimated excess thrust impulse.

Referring to FIG. 3A, graph 300 presents net thrust of the engine, such as engine 10, over time for both an actual net thrust 304 and a reference net thrust 306 for the example of FIG. 2A. Note that the thrust values are estimated using various engine parameters as there is no thrust measurement system per se in an aircraft. The actual net thrust is the net thrust applied by an engine. In a normally behaving engine, the actual thrust will lag the reference thrust during transient maneuvers, such as slam acceleration and deceleration, by some time. In steady state operation, both the reference thrust and the actual thrust should be approximately equal.

In the first part of both curves, there is no discrepancy between actual net thrust 304 and reference net thrust 306. At the point of inflection 302, the actual net thrust 304 begins to deviate from the reference net thrust 306. Over time, the difference between the actual net thrust 304 and the reference net thrust 306 increases. The difference between the actual net thrust 304 and the reference net thrust 306 corresponds to the estimated excess thrust. The estimated excess thrust is integrated over a fixed period of time to determine an estimated excess thrust impulse:

$$\text{Estimated Excess Thrust Impulse} = \int_a^b \text{Estimated Excess Thrust } dt$$

The estimated excess thrust impulse thus corresponds to the hatched portion 308 between the two curves representing actual net thrust 304 and reference net thrust 306, and is an estimate of the excess thrust that is applied to the aircraft over a period of time. The estimated excess thrust impulse is compared to a predetermined UHT detection threshold. If the value exceeds the threshold, UHT is latched and accommodations are triggered. By considering excess thrust impulse instead of only excess thrust, smaller excess thrust amounts that last for longer periods of time may be detected, contrary to other methods.

Figure 3B:
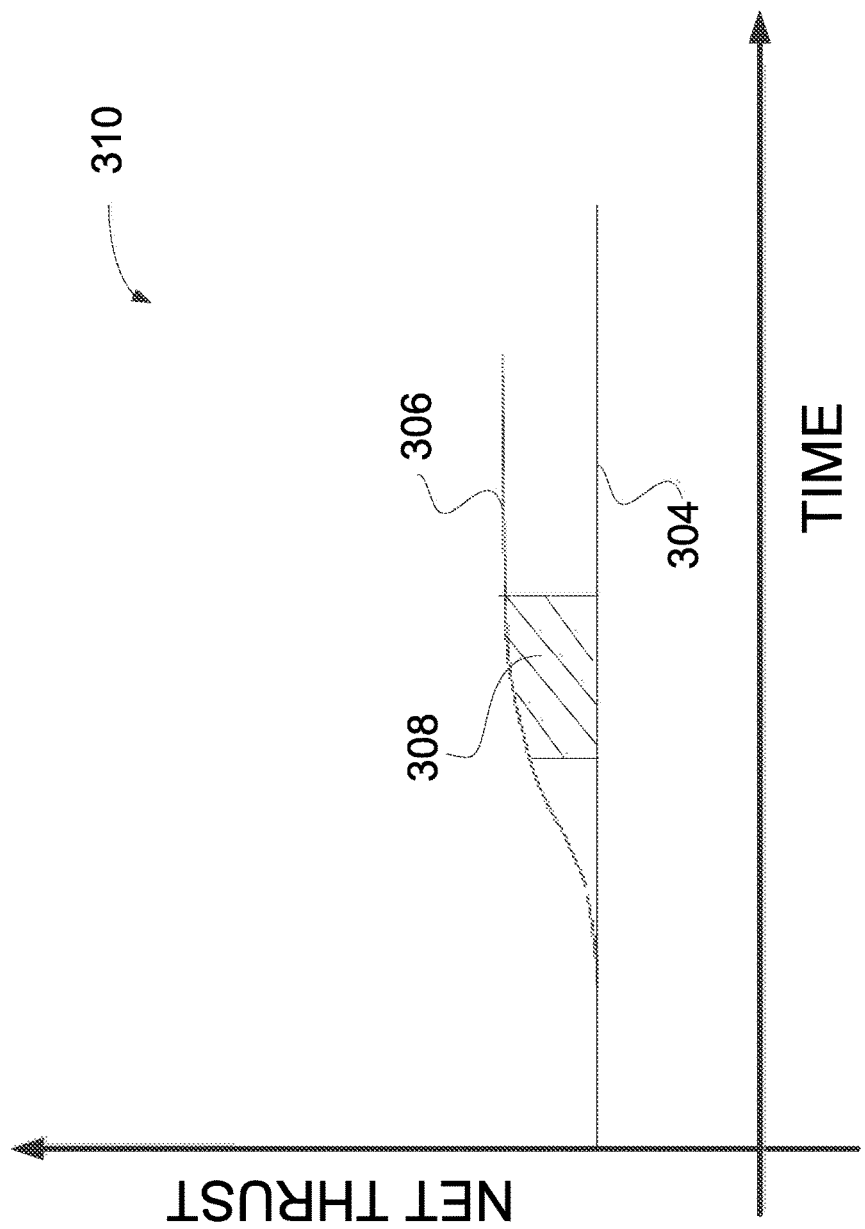
FIG. 3B is 3B is a second graph illustrating net thrust over time to determine an estimated excess thrust impulse.

Each aircraft is capable of handling a certain amount of excess thrust. Therefore, the UHT detection threshold is selected based on UHT simulations for a given aircraft model and may vary accordingly. Note that integration begins at time t=a, which corresponds to the time at which the fuel flow error was found to exceed the fuel flow error threshold and other UHT permissives are met. The fuel flow error thus acts as a trigger for integrating the estimated excess thrust to determine the estimated excess thrust impulse. In FIG. 3B, graph 310 illustrates a similar scenario for determining the excess thrust impulse in accordance with the embodiment of FIG. 2B.

Figure 4A:
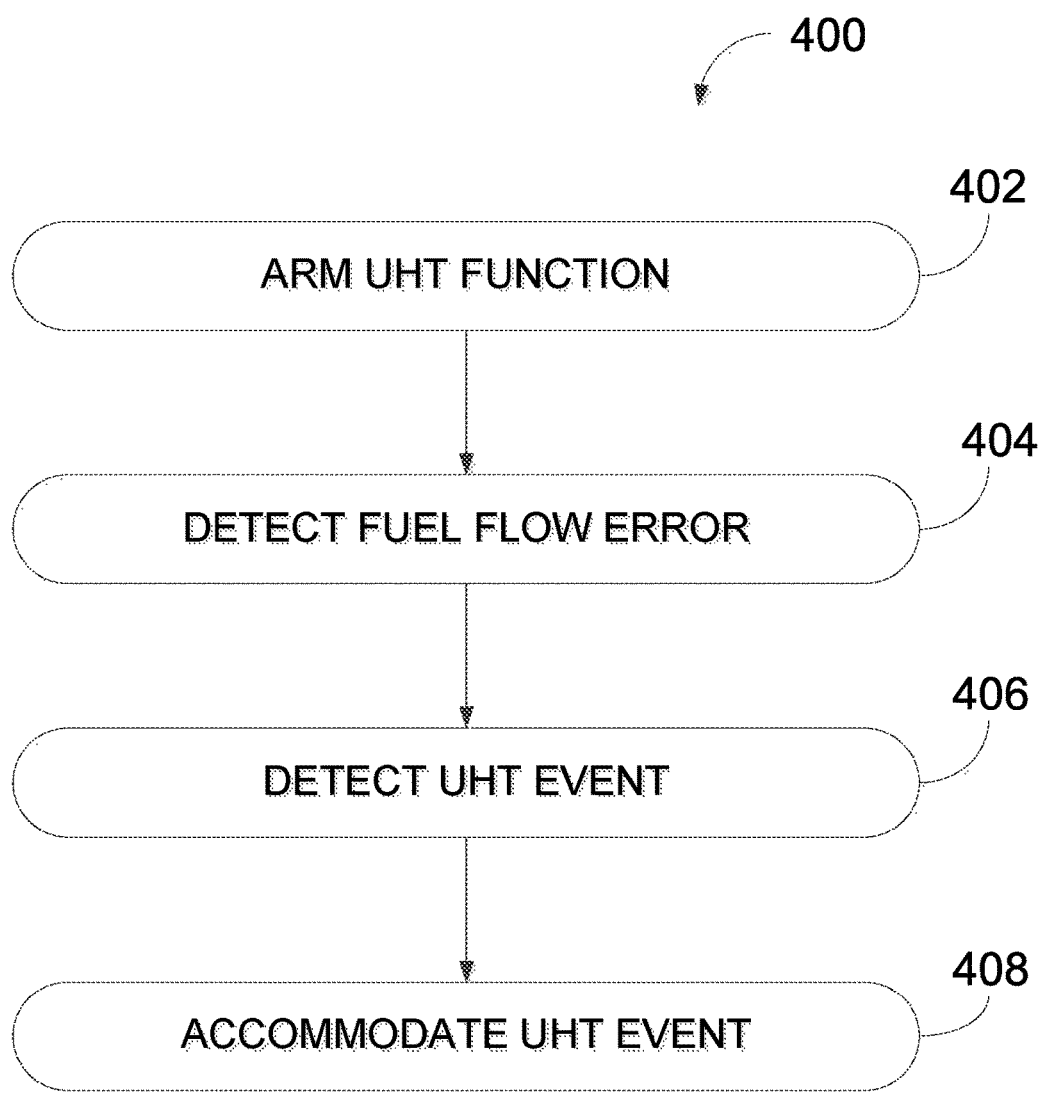
FIGS. 4A-4C are flowcharts illustrating example embodiments of the method for detecting a UHT event.

Referring now to FIG. 4A, there is illustrated an example embodiment of a method 400 for detecting a UHT event in an aircraft. At step 402, the UHT function is armed. In some embodiments, arming the UHT event is conditional on detecting that the aircraft is in a critical flight phase. For example, the aircraft is on the ground, or in an approach phase below a certain altitude. In some embodiments, any one of these conditions will arm the UHT function. Alternatively or in combination therewith, another condition for arming the UHT function is that the pilot has commanded low or reverse thrust, for example with a TLA at idle or below.

Figure 4B:
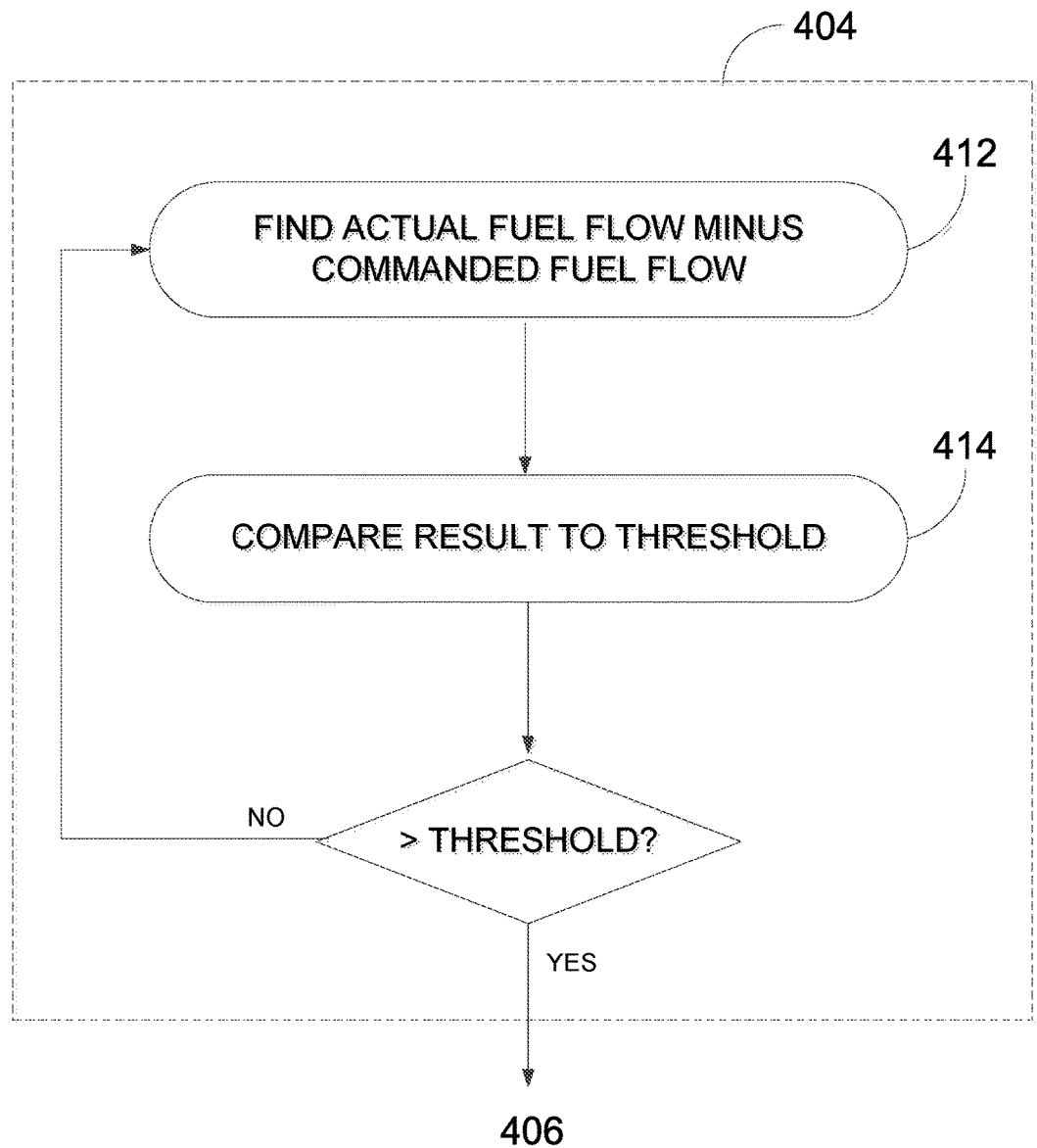

At step 404, a fuel flow error is detected. This occurs when the difference between the actual fuel flow and the commanded fuel flow exceeds the fuel flow error threshold. Fuel flow error in excess of an expected norm is indicative of the presence of excess thrust. FIG. 4B illustrates an example embodiment for detecting the fuel flow error. At step 412, actual fuel flow minus the commanded fuel flow is calculated. At step 414, the result is compared to the fuel flow error threshold. When the difference exceeds the threshold, the method moves on to step 406. Note that the fuel flow error threshold may be fixed or dynamic, as a function of other engine parameters.

Figure 4C:
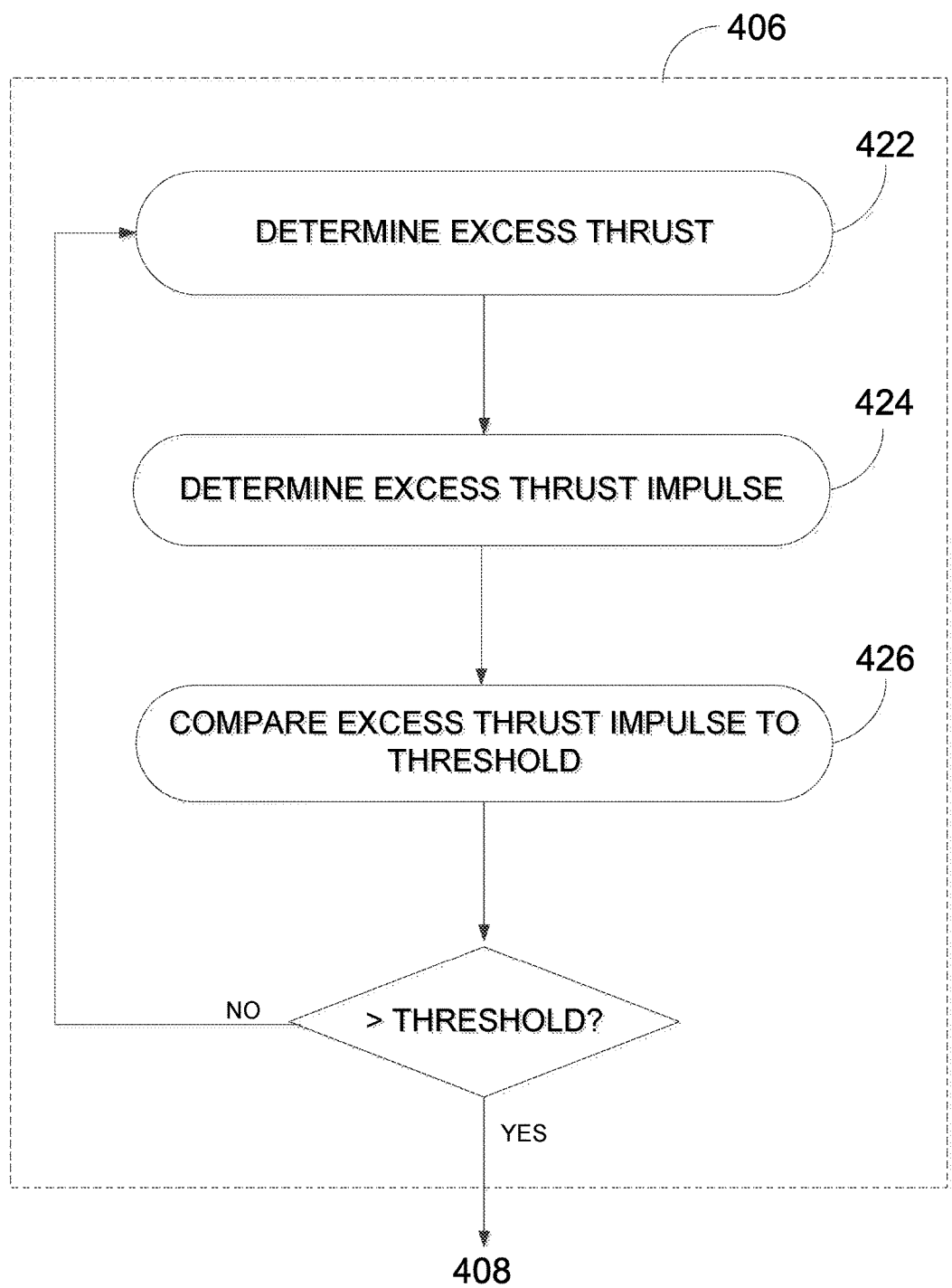

Referring back to FIG. 4a, at step 406, the UHT event is detected based on the excess thrust and as a function of the UHT detection threshold. FIG. 4C illustrates an example embodiment for detecting the UHT event. At step 422, a difference between the actual net thrust and the reference net thrust is calculated to find the estimated excess thrust. In some embodiments, actual net thrust is proportional to a rotational speed of the engine and may thus be determined from a measured engine speed. In other embodiments, an engine pressure ratio (EPR) may be used. Similarly, reference net thrust is proportional to a reference engine speed and is a function of the TLA angle. At step 424, the difference between the actual net thrust and the reference net thrust, i.e. the estimated excess thrust, is integrated over a fixed period of time to determine an estimated excess thrust impulse. At step 426, the estimated excess thrust impulse is compared to the UHT detection threshold. When the UHT detection threshold is exceeded, the method 400 moves on to step 408.

At step 408 of FIG. 4a, the UHT event is accommodated. There are many known techniques to accommodate UHT events and any one of these may be used. Accommodation refers to cutting off the fuel flow to the engine. Since UHT events can result from failures affecting the FMU, some embodiments shut off the fuel flow independently from the FMU, for example via an emergency shutoff valve. A command signal may be sent by an engine controller, for example, or any other suitable control system. In some embodiments, the control system has a dual channel architecture and each channel has independent means of detecting an accommodating the UHT event. This may protect against an uncovered processor failure.

In some embodiments, certain conditions will cause the method 400 to disarm the UHT function. For example, if a pilot command requesting a power level higher than idle is detected or if an on/off engine switch is set to off, the UHT function will be disarmed. Similarly, if any of the conditions used to arm the UHT function are no longer true, such as the critical flight phase, the UHT function may be disarmed.

In some embodiments, the thrust integral is reset when any one of certain conditions are met. The thrust integral reset conditions are as follows: (a) the estimated excess thrust impulse falls below a threshold for a duration of time; (b) the fuel flow error falls below a threshold for a duration of time; (c) [UHT Flight Phase] is false; (d) the pilot requests a power level higher than idle.

In some embodiments, the fuel flow error threshold has an upper and a lower limit. The upper limit acts as described above, to trigger step 406 of the method 400. When the fuel flow error falls below the lower limit for a period of time, step 404 begins again, or returns to step 412.

Figure 5:
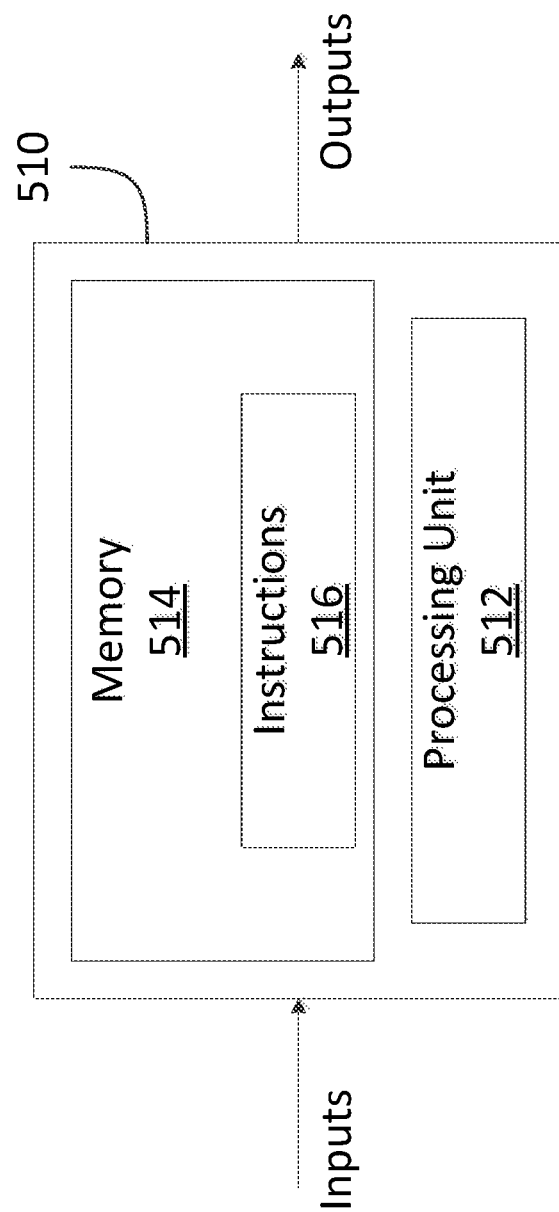
FIG. 5 is a block diagram of an example computing device for implementing the methods of FIGS. 4A-4C.

With reference to FIG. 5, the method 400 may be implemented by a computing device 510, comprising a processing unit 512 and a memory 514 which has stored therein computer-executable instructions 516. The processing unit 512 may comprise any suitable devices configured to implement the system such that instructions 516, when executed by the computing device 510 or other programmable apparatus, may cause the functions/acts/steps of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

In some embodiments, the computing device 510 corresponds to or forms part of one or more full-authority digital engine controls (FADEC), electronic engine controller (EEC) engine control unit (ECU), and other engine control systems.

The methods and systems for detecting a UHT event described herein may be implemented in a high level procedural or object oriented programming or scripting language, or a combination thereof, to communicate with or assist in the operation of a computer system, for example the computing device 510. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 512 of the computing device 510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling operation of a first propeller of an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting an uncommanded or uncontrollable high thrust (UHT) event in an aircraft, the method comprising:
   arming a UHT detection function based on detecting that the aircraft is in a critical flight phase;
   when the UHT detection function is armed, detecting a fuel flow error when an actual fuel flow minus a commanded fuel flow exceeds a first threshold, the fuel flow error indicative of a presence of excess thrust;
   in response to detecting the fuel flow error, detecting a UHT event based on excess thrust and as a function of a second threshold; and
   accommodating the UHT event, wherein accommodating the UHT event comprises triggering a fuel shutoff valve.

2. The method of claim 1, wherein detecting the UHT event comprises:
   determining an estimated excess thrust as an actual net thrust minus a reference net thrust;
   determining an estimated excess thrust impulse by integrating the estimated excess thrust over a period of time; and
   comparing the estimated excess thrust impulse to the second threshold.

3. The method of claim 2, wherein the actual net thrust is calculated from a measured engine speed, and the reference net thrust is calculated from a reference engine speed as a function of a thrust lever angle position.

4. The method of claim 1, wherein arming the UHT function comprises enabling the UHT function when a flight phase of the aircraft corresponds to on ground or in an approach phase, and a thrust lever angle position corresponds to idle or below.

5. The method of claim 1, wherein the second threshold is specific to an aircraft model.

6. The method of claim 2, wherein the second threshold comprises an upper and a lower limit, wherein the UHT event is detected when the estimated excess thrust impulse exceeds the upper limit, and the estimated excess thrust impulse is reset when the estimated excess thrust impulse falls below the lower limit for a predetermined time period.

7. The method of claim 2, wherein the first threshold comprises an upper and a lower limit, wherein the fuel flow error is detected when the actual fuel flow minus the commanded fuel flow exceeds the upper limit, and the estimated excess thrust impulse is reset when the fuel flow error falls below the lower limit for a predetermined time period.

8. The method of claim 1, further comprising disarming the UHT function upon detecting of a pilot command requesting a power level higher than a predetermined low thrust set point.

9. A system for detecting an uncommanded or uncontrollable high thrust (UHT) event in an aircraft, the system comprising:
    at least one processing unit; and
    a non-transitory computer-readable memory having stored thereon program instructions executable by the at least one processing unit for:
        arming a UHT detection function based on detecting that the aircraft is in a critical flight phase;
        when the UHT detection function is armed, detecting a fuel flow error when an actual fuel flow minus a commanded fuel flow exceeds a first threshold, the fuel flow error indicative of a presence of excess thrust;
        in response to detecting the fuel flow error, detecting a UHT event based on excess thrust and as a function of a second threshold; and
        accommodating the UHT event, wherein accommodating the UHT event comprises triggering a fuel shut-off valve.

10. The system of claim 9, wherein detecting the UHT event comprises:
    determining an estimated excess thrust as an actual net thrust minus a reference net thrust;
    determining an estimated excess thrust impulse by integrating the estimated excess thrust over a period of time; and
    comparing the estimated excess thrust impulse to the second threshold.

11. The system of claim 10, wherein the actual net thrust is calculated from a measured engine speed, and the reference net thrust is calculated from a reference engine speed as a function of a thrust lever angle position.

12. The system of claim 9, wherein arming the UHT function comprises enabling the UHT function when a flight phase of the aircraft corresponds to on ground or in an approach phase, and a thrust lever angle position corresponds to idle or below.

13. The system of claim 9, wherein the second threshold is specific to an aircraft model.

14. The system of claim 10, wherein the second threshold comprises an upper and a lower limit, wherein the UHT event is detected when the estimated excess thrust impulse exceeds the upper limit, and the estimated excess thrust impulse is reset when the estimated excess thrust impulse falls below the lower limit for a predetermined time period.

15. The system of claim 10, wherein the first threshold comprises an upper and a lower limit, wherein the fuel flow error is detected when the actual fuel flow minus the commanded fuel flow exceeds the upper limit, and the estimated excess thrust impulse is reset when the fuel flow error falls below the lower limit for a predetermined time period.

16. The system of claim 9, wherein the program instructions are further executable for disarming the UHT function upon detecting of a pilot command requesting a power level higher than a predetermined low thrust set point.

17. A non-transitory computer readable medium having stored thereon program code executable by a processor for detecting an uncommanded or uncontrollable high thrust (UHT) event in an aircraft, the program code comprising instructions configured for:
    arming a UHT detection function based on detecting that the aircraft is in a critical flight phase;
    when the UHT detection function is armed, detecting a fuel flow error when an actual fuel flow minus a commanded fuel flow exceeds a first threshold, the fuel flow error indicative of a presence of excess thrust;
    in response to detecting the fuel flow error, detecting a UHT event based on excess thrust and as a function of a second threshold; and
    accommodating the UHT event, wherein accommodating the UHT event comprises triggering a fuel shutoff valve.

18. The non-transitory computer readable medium of claim 17, wherein detecting the UHT event comprises:
    determining an estimated excess thrust as an actual net thrust minus a reference net thrust;
    determining an estimated excess thrust impulse by integrating the estimated excess thrust over a period of time; and
    comparing the estimated excess thrust impulse to the second threshold.

\* \* \* \* \*